US008930296B2

(12) United States Patent
McBride et al.

(10) Patent No.: US 8,930,296 B2
(45) Date of Patent: Jan. 6, 2015

(54) METHOD AND SYSTEM FOR PROGRAMMING VIRTUAL ROBOTS USING A TEMPLATE

(71) Applicant: Conversive, Inc., Malibu, CA (US)

(72) Inventors: Aaron Joseph McBride, Calabasas, CA (US); Rob Rappaport, Malibu, CA (US); Jeremy Romero, Calabasas, CA (US); Christopher Brennan, Northridge, CA (US); Robert Williams, Pacific Palisades, CA (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 13/848,906

(22) Filed: Mar. 22, 2013

(65) Prior Publication Data

US 2014/0122625 A1 May 1, 2014

Related U.S. Application Data

(63) Continuation of application No. 10/705,208, filed on Nov. 10, 2003, now abandoned.

(51) Int. Cl.
*G06N 5/02* (2006.01)
*H04L 12/58* (2006.01)
*G06N 99/00* (2010.01)
*G06F 17/30* (2006.01)

(52) U.S. Cl.
CPC ............ *H04L 51/02* (2013.01); *G06F 17/3089* (2013.01); *G06N 5/025* (2013.01); *G06N 99/005* (2013.01)
USPC .......................................................... 706/47

(58) Field of Classification Search
CPC .... G06N 5/022; G06N 5/025; G06F 17/3089; Y10S 706/934; Y10S 707/99935
USPC ..................................................... 706/47, 934
See application file for complete search history.

(56) References Cited

U.S. PATENT DOCUMENTS

| 5,862,325 | A |   | 1/1999  | Reed et al.               |
|-----------|---|---|---------|---------------------------|
| 5,870,552 | A |   | 2/1999  | Dozier et al.             |
| 5,907,837 | A | * | 5/1999  | Ferrel et al. ... 707/999.003 |
| 5,963,940 | A |   | 10/1999 | Liddy et al.              |
| 6,173,311 | B1|   | 1/2001  | Hassett et al.            |
| 6,366,300 | B1|   | 4/2002  | Ohara et al.              |
| 6,393,474 | B1|   | 5/2002  | Eichert et al.            |
| 6,484,149 | B1| * | 11/2002 | Jammes et al. ... 705/26.62 |
| 6,529,904 | B1|   | 3/2003  | Elsbernd et al.           |

(Continued)

OTHER PUBLICATIONS

Habraken, J. "Microsoft Office XP 8-in-1"—Part III: Word—Chapter 2: Working with Documents. 2001. 16 pages.*

(Continued)

*Primary Examiner* — Jeffrey A Gaffin
*Assistant Examiner* — Benjamin Buss
(74) *Attorney, Agent, or Firm* — The Webb Law Firm

(57) ABSTRACT

Disclosed is a method for processing input entered by a user and providing at least one response maintained by an administrator in a system for autonomously processing requests. A template is provided to the administrator, wherein the template includes at least one field to elicit specific information from the administrator. The information is received from the administrator into the template. The information is saved for use in providing the at least one response in reply to a request from a user. An apparatus for performing this method is also disclosed.

35 Claims, 13 Drawing Sheets

(56) References Cited

U.S. PATENT DOCUMENTS

| | | | |
|---|---|---|---|
| 6,532,201 | B1 | 3/2003 | Hogan |
| 6,532,401 | B2 | 3/2003 | Tackett et al. |
| 6,775,658 | B1 | 8/2004 | Zothner |
| 6,834,298 | B1 | 12/2004 | Singer et al. |
| 6,980,962 | B1 | 12/2005 | Arganbright et al. |
| 2001/0054096 | A1* | 12/2001 | Morikawa et al. ............ 709/223 |
| 2002/0178008 | A1 | 11/2002 | Reynar |
| 2003/0023573 | A1 | 1/2003 | Chan et al. |
| 2003/0145281 | A1 | 7/2003 | Thames et al. |
| 2003/0163783 | A1* | 8/2003 | Chikirivao et al. ............ 715/513 |
| 2003/0220890 | A1 | 11/2003 | Okude |
| 2004/0099731 | A1 | 5/2004 | Olenick et al. |
| 2004/0181753 | A1 | 9/2004 | Michaelides |

OTHER PUBLICATIONS

Androutsopoulos, I. et. al. "Natural Language Interfaces to Databases—An Introduction." arXiv:cmp-Ig/9503016v1 pp. 1-50. Mar. 14, 1995.*

Weiskamp, K. et al. "Artificial Intelligence Programming with Turbo Prolog." pp. 7 & 129-140. 1988.*

Wallace, R.S. "The Elements of AIML Style." Alice A.I. Foundation, Inc. pp. 1-86. Mar. 28, 2003.*

Bhaumik et al., "Integrating Hypermedia Functionality into Database Applications", Collaborative Hypermedia Laboratory, CIS Department, New Jersey Institute of Technology, USA, 2001, 32 pages.

Dorai et al., "Embedded Grammar Tags: Advancing Natural Language Interaction on the Web", IEEE Intelligent Systems, 2002, pp. 48-53.

Goh et al., "Intelligent Agent Technology in E-commerce", IDEAL 2003, LNCS 2690, Mar. 2003, pp. 10-17.

Ibrahim et al., "TARO: an Interactive, Object-Oriented Tool for Building Natural Language Systems", IEEE, 1989, pp. 108-113.

Schwartz et al., "Applying an Information Gathering Architecture to Netfind: A White Pages Tool for a Changing and Growing Internet", IEEE/ACM Transactions on Networking, Oct. 1994, p. 426-439, vol. 2, No. 5.

Thompson et al., Using a Menu-Based Natural Language Interface to Ask Map- and Graph-Valued Database Quieries, ACM, 1985, pp. 328-338.

Uszkoreit et al., "DISCO—An HPSG-based NLP System and its Application for Appointment Scheduling", German Research Center for Artificial Intelligence (DFKI), 1994, pp. 436-440.

* cited by examiner

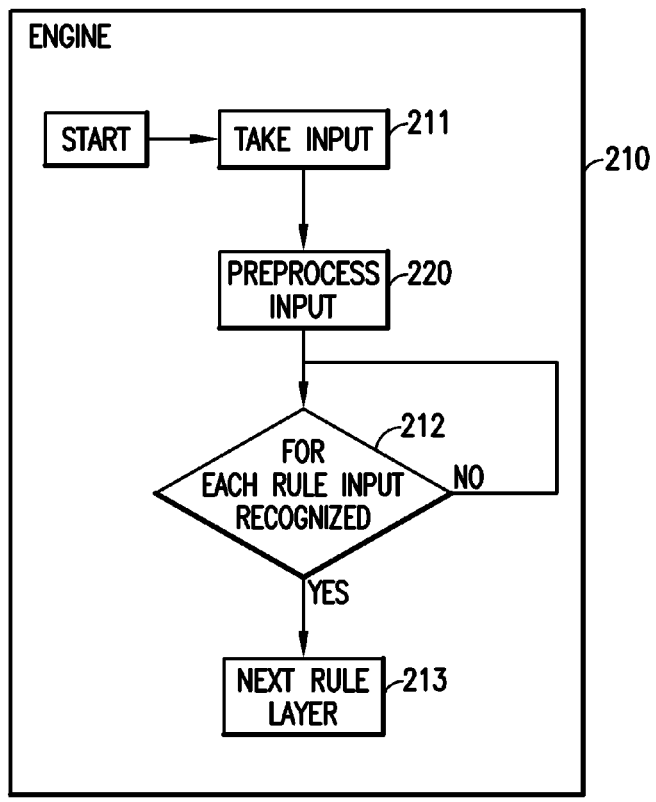
FIG.2.1
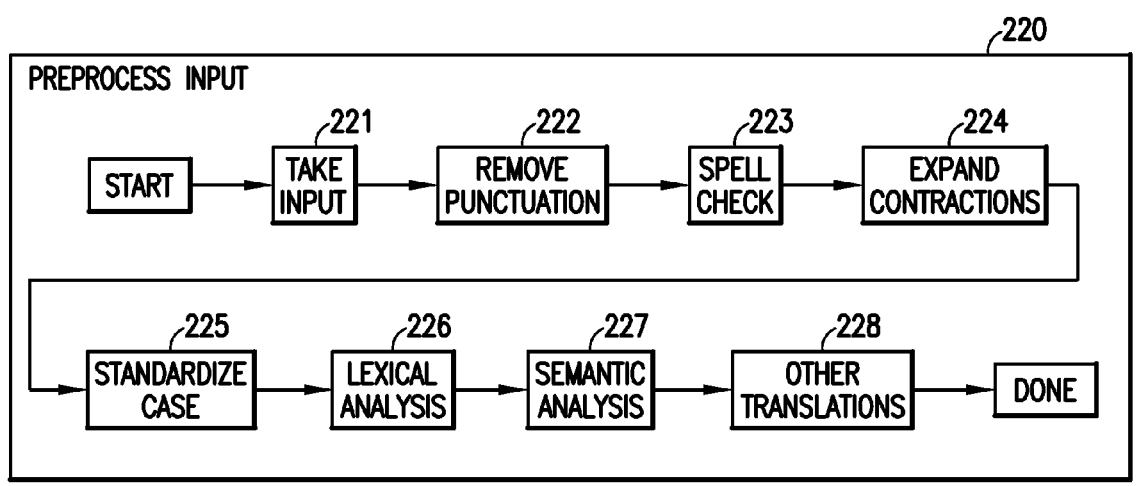
FIG.2.2

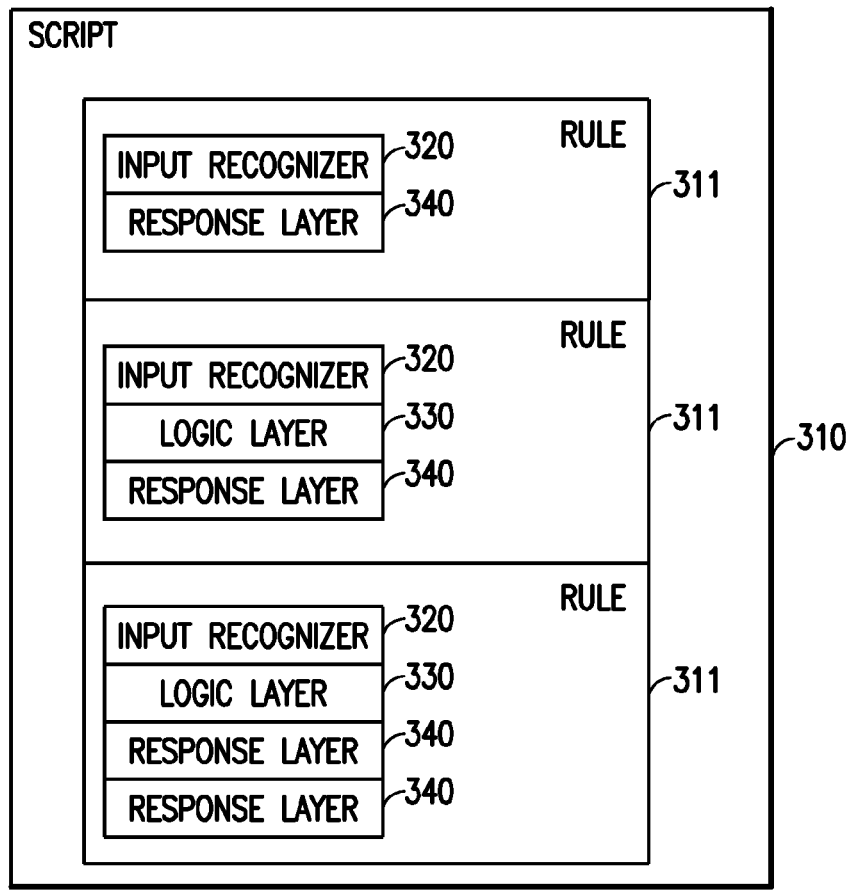
FIG.3.1
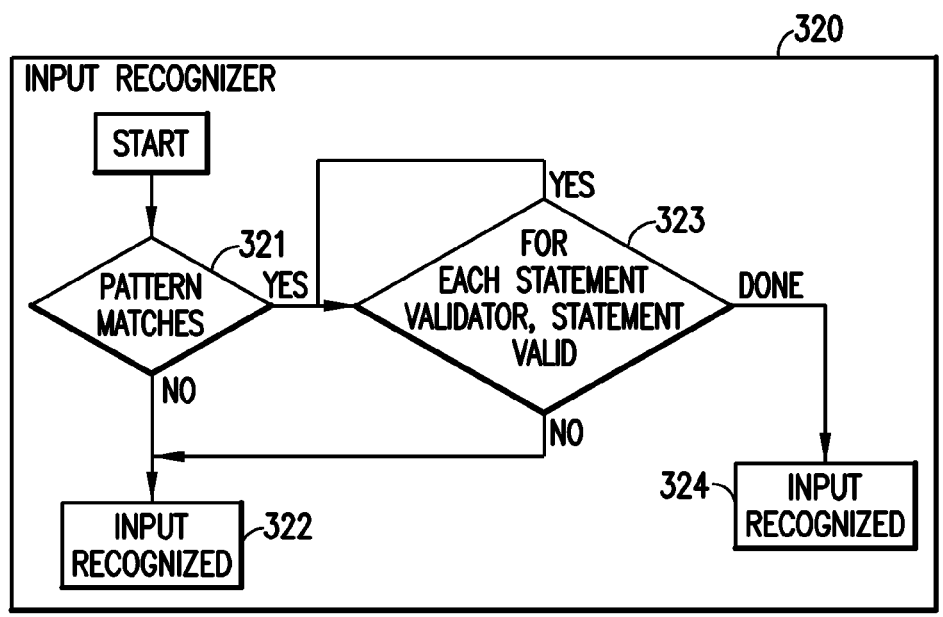
FIG.3.2

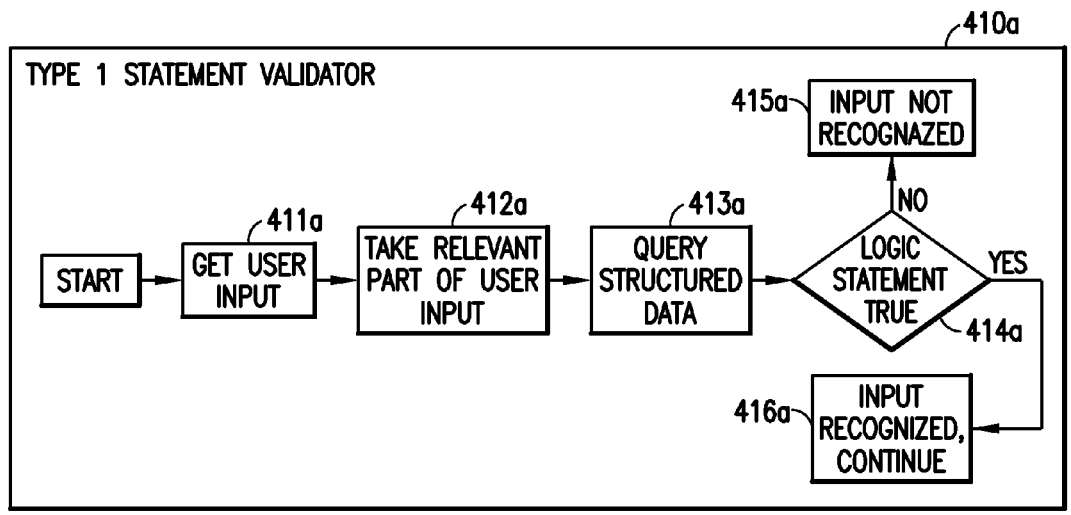
FIG.4.1
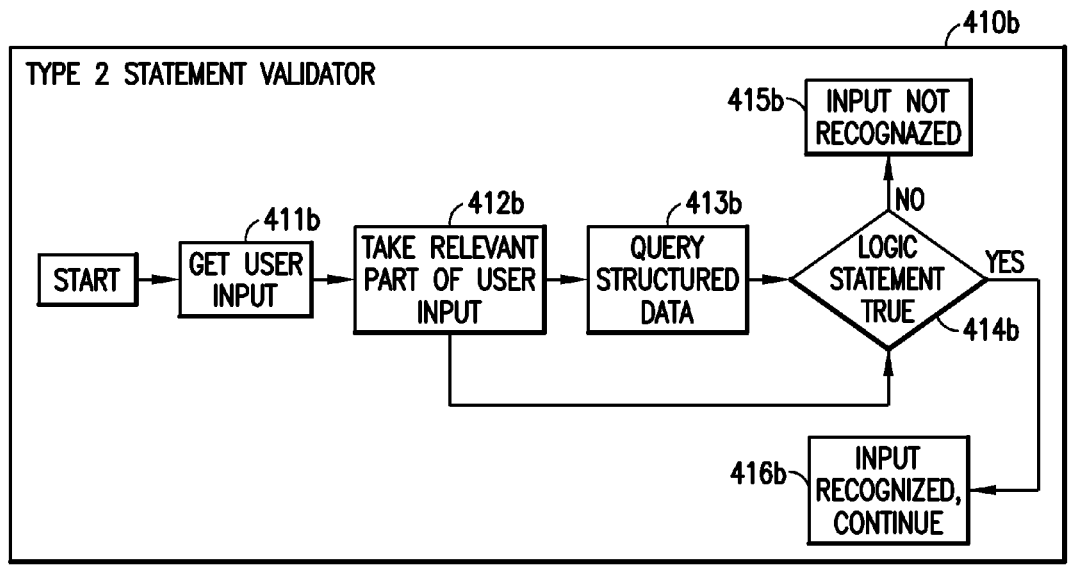
FIG.4.2

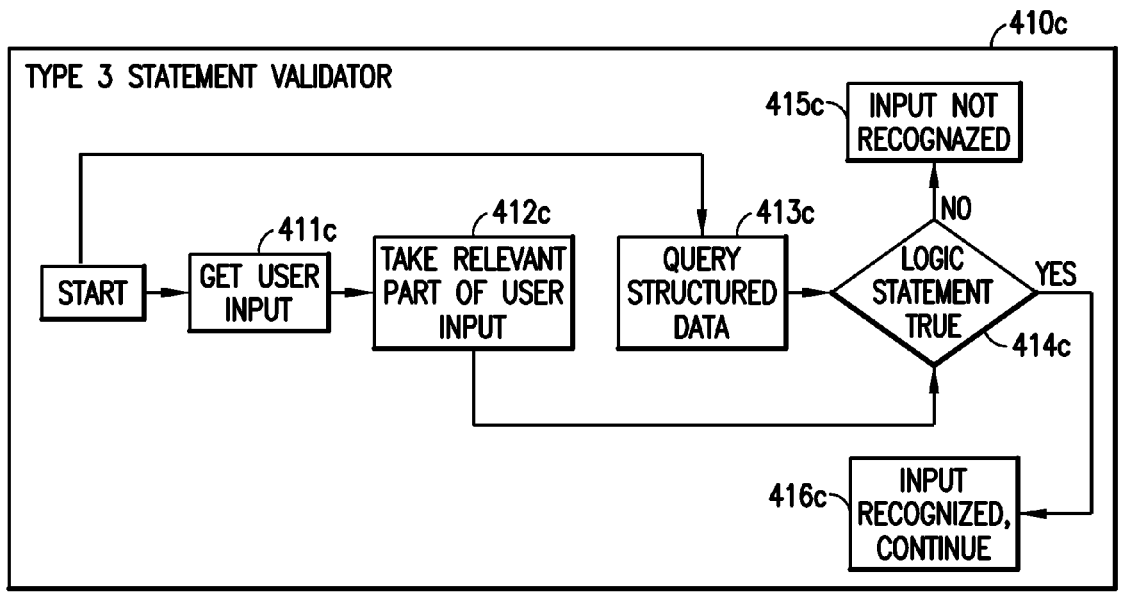
FIG.4.3
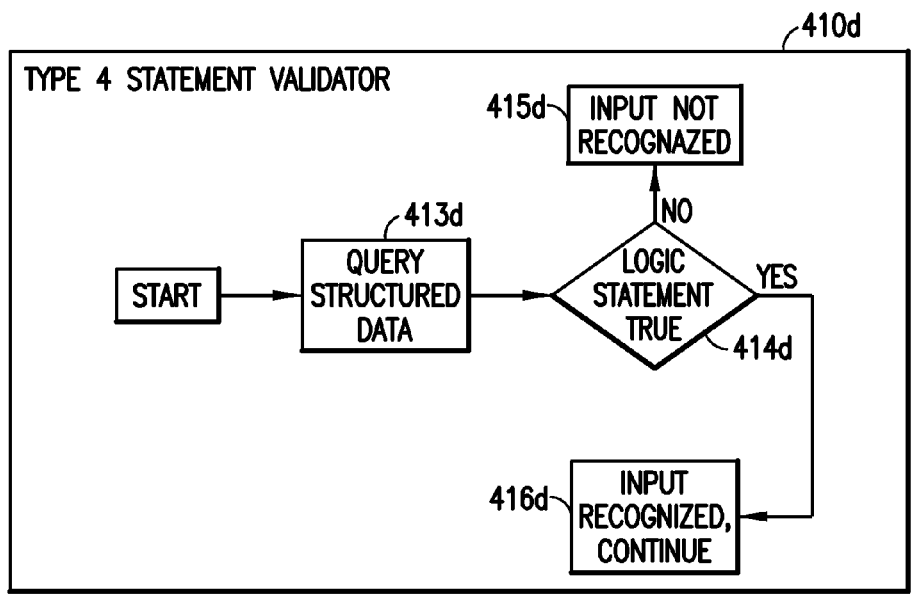
FIG.4.4

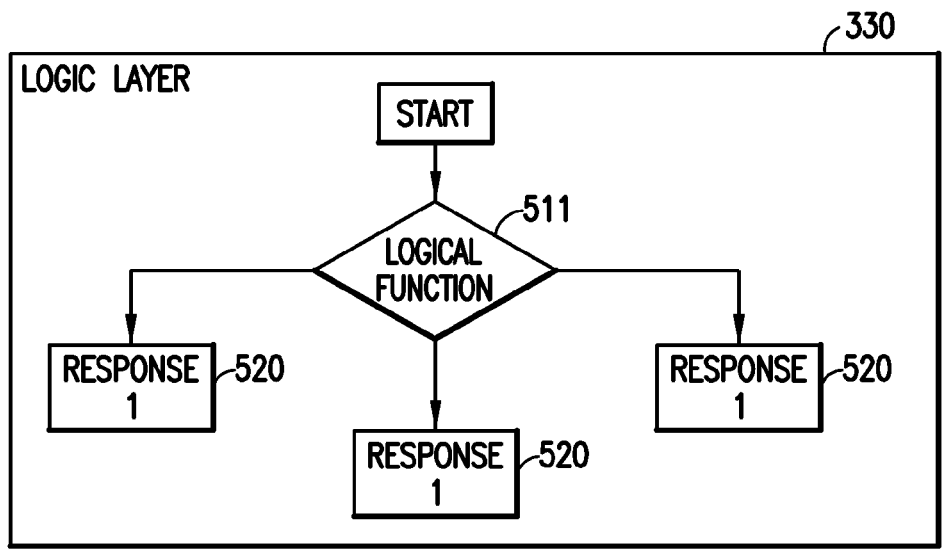
FIG.5.1
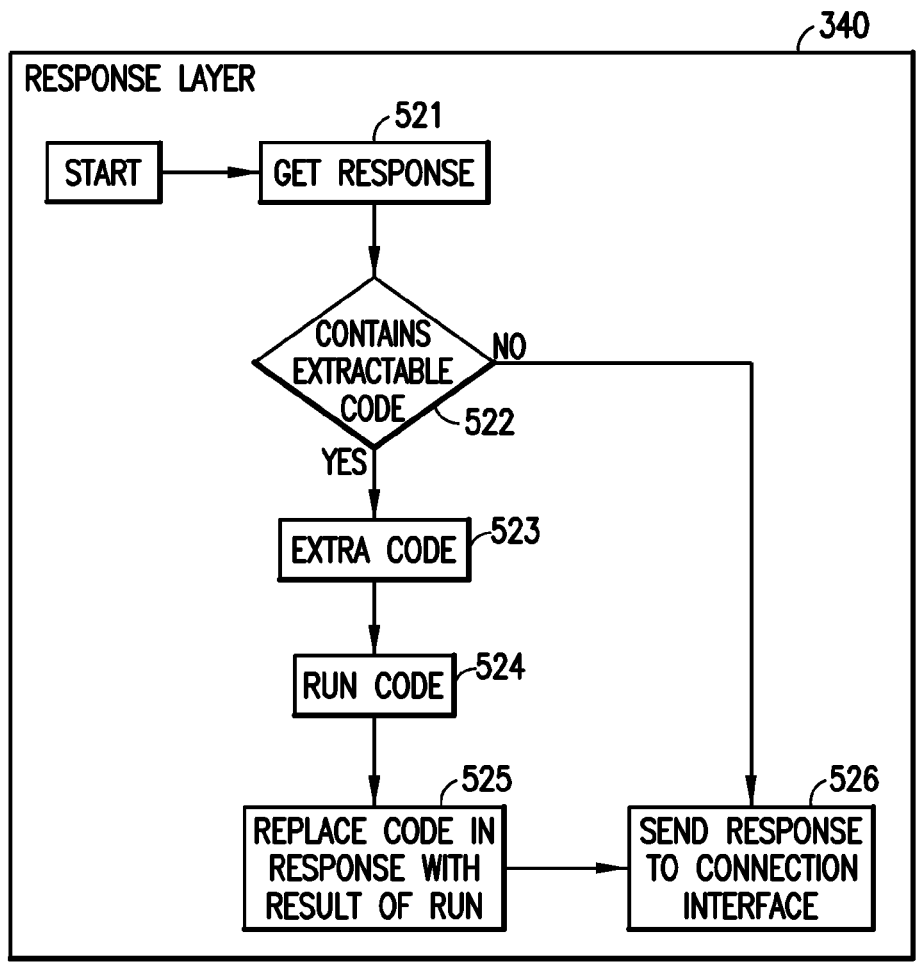
FIG.5.2

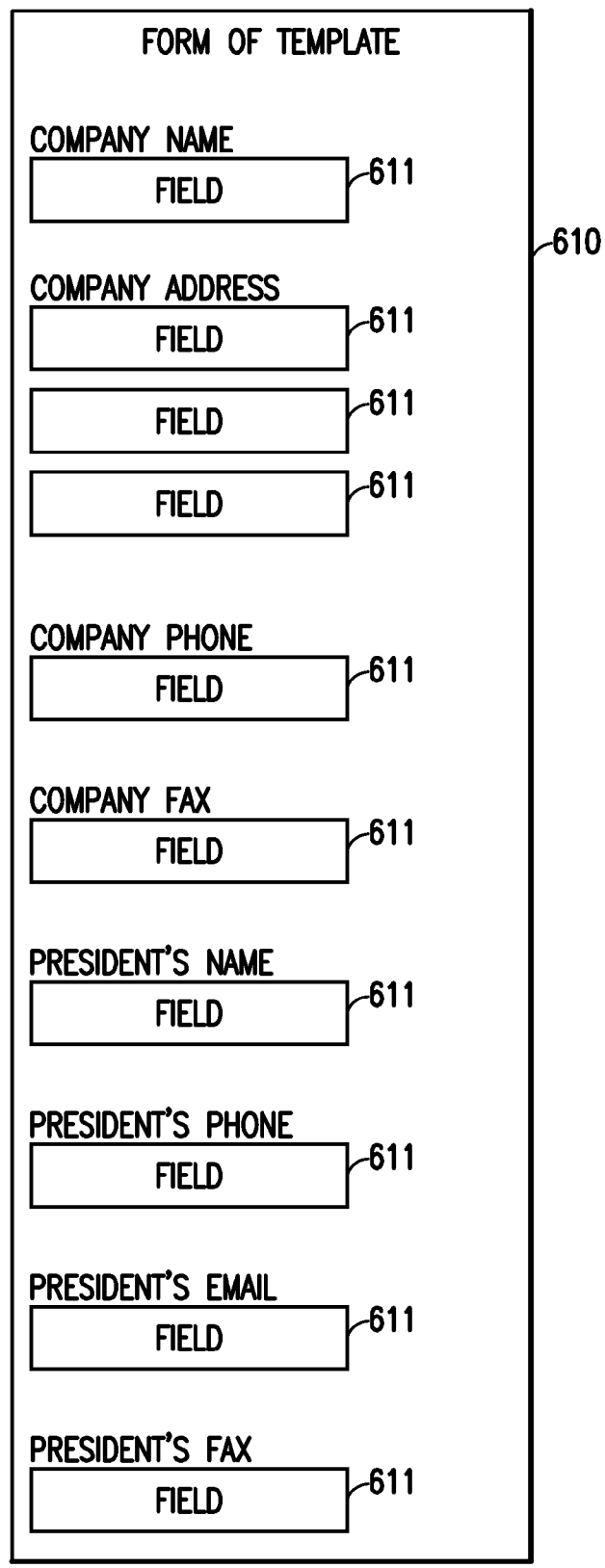
FIG.6.1

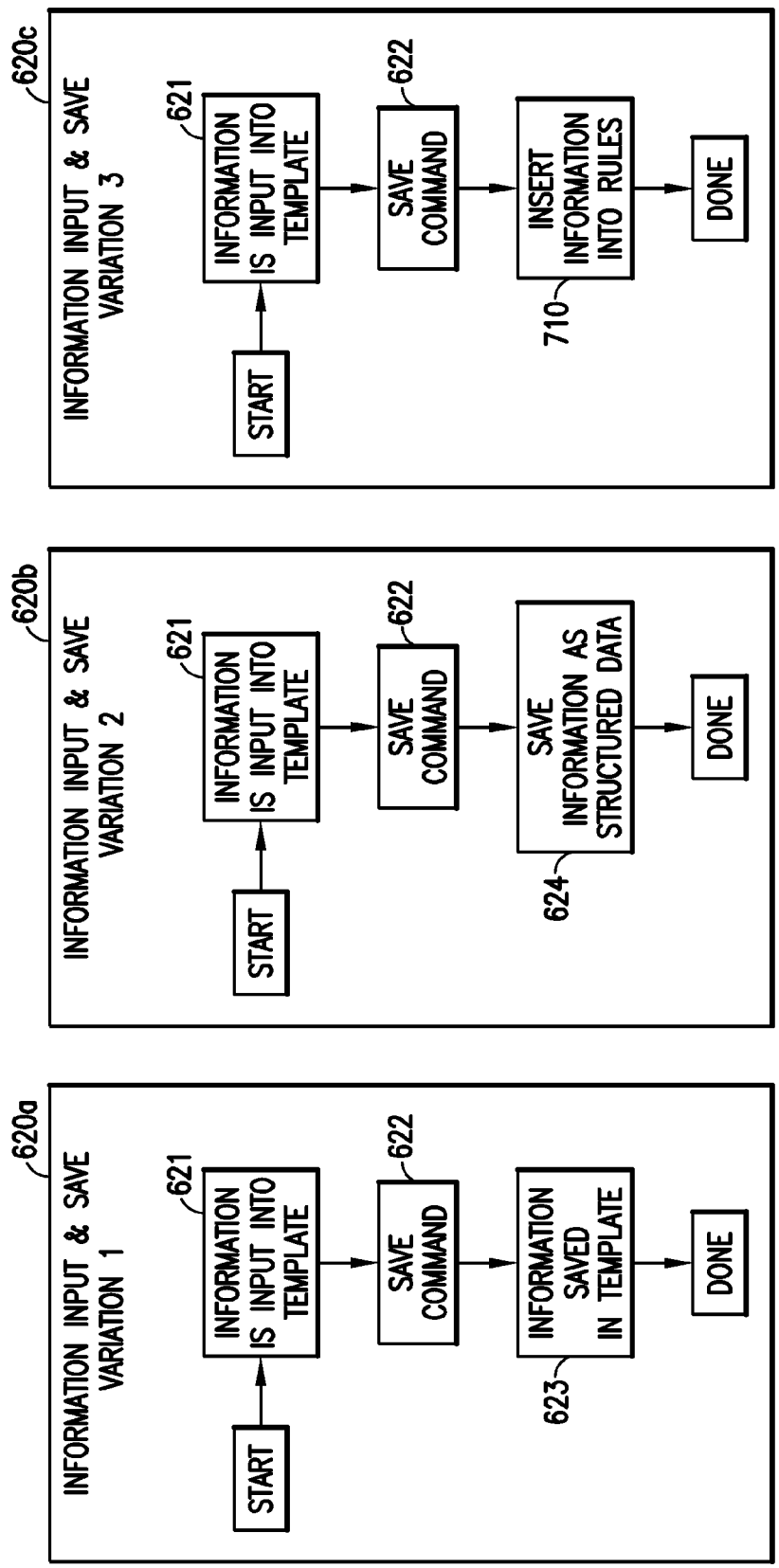

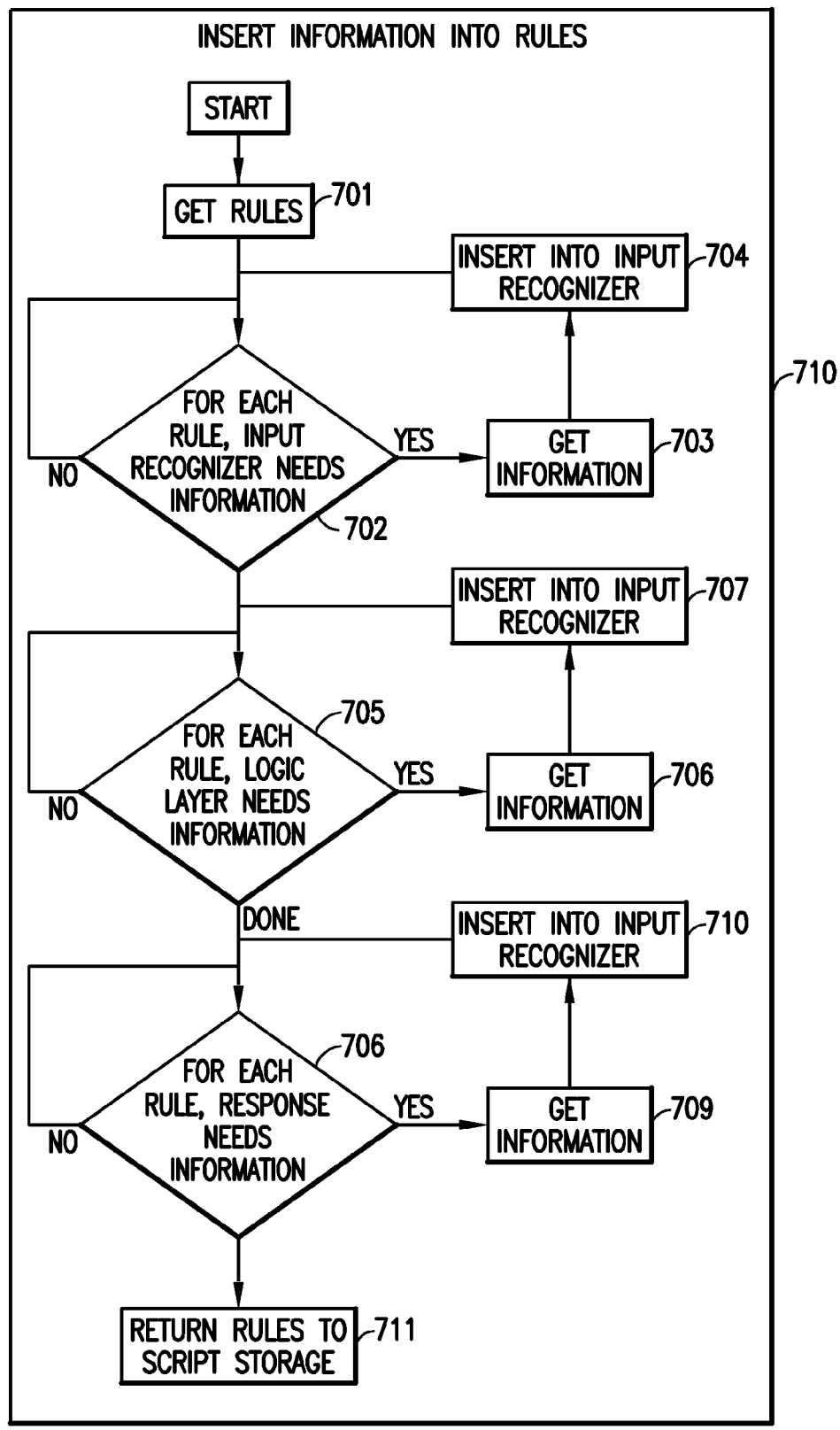
FIG.7.1

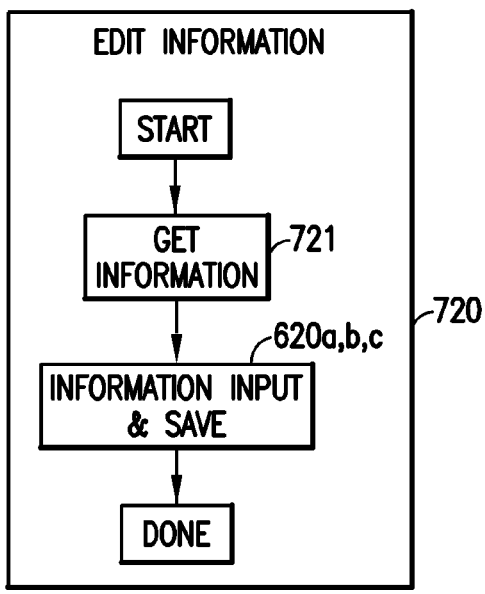
FIG.7.2
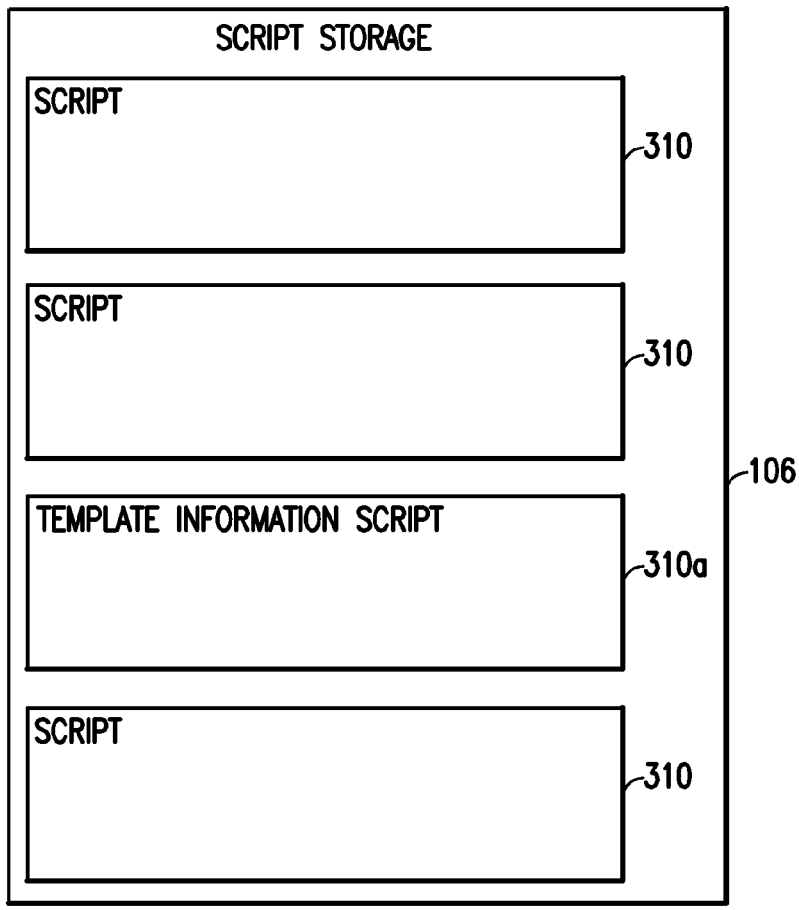
FIG.8

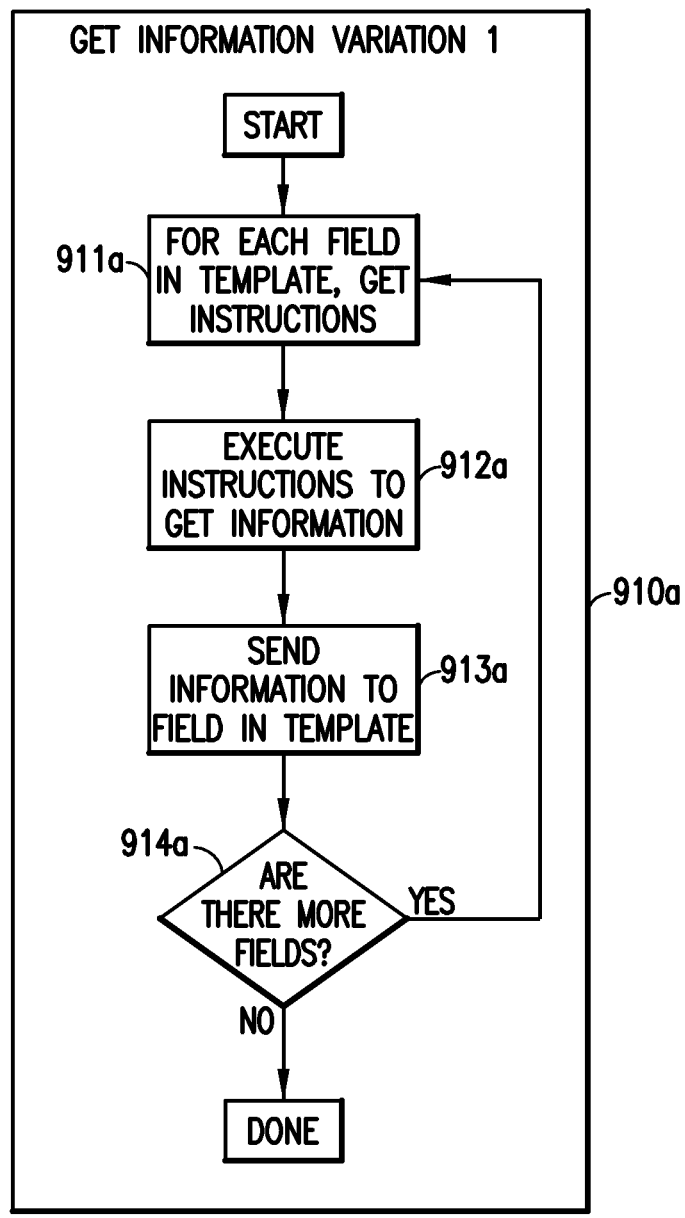
FIG.9.1

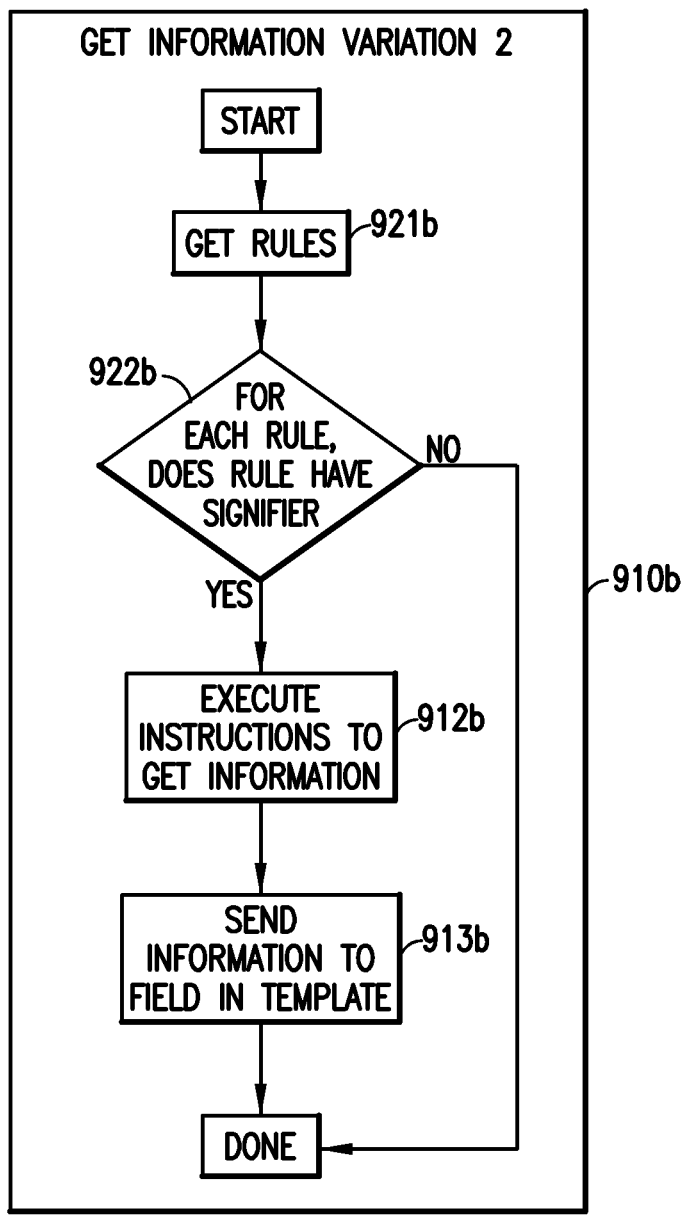
FIG.9.2

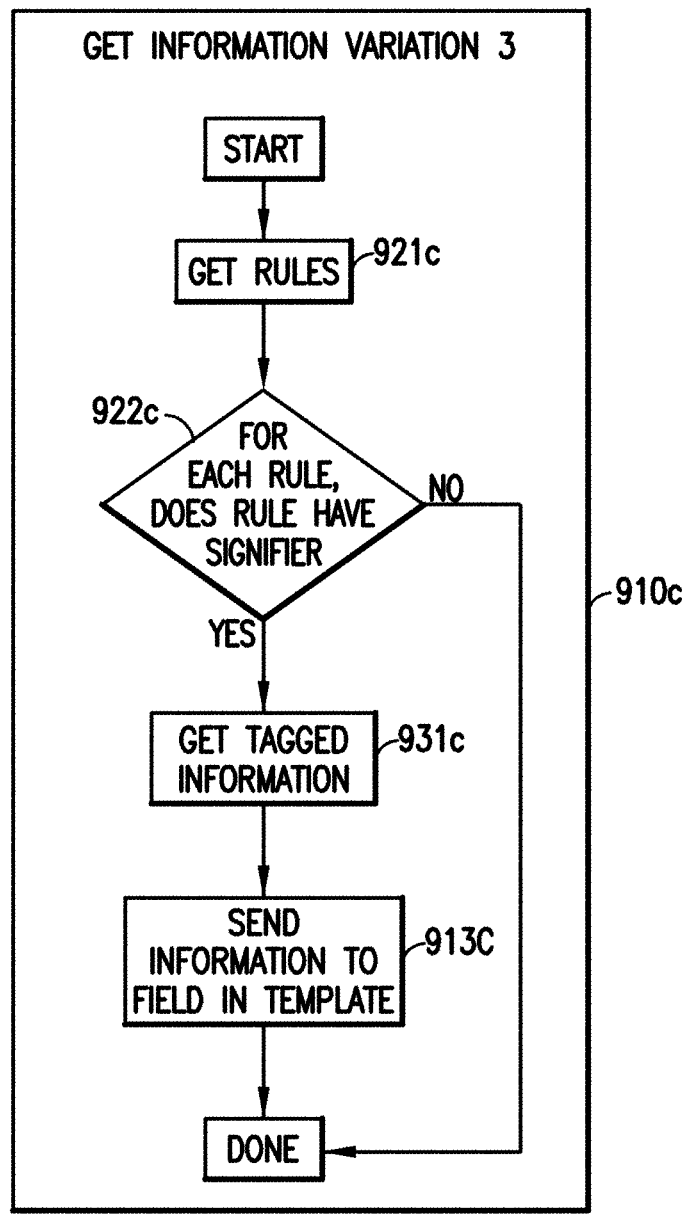
FIG.9.3

METHOD AND SYSTEM FOR PROGRAMMING VIRTUAL ROBOTS USING A TEMPLATE

BACKGROUND OF THE INVENTION

1. Field of the Invention

The present invention is directed to a method and system for the use of virtual robots ("Bots") to autonomously process requests. More particularly, this invention is directed to a method and system for the mass customization of Bots by administrators having no specialized knowledge or experience in the art.

2. Description of Related Art

For the purposes of the present invention, data maintained in a database, file, or other source of structured and/or tagged data is referred to herein as "structured data". So called "virtual robots" (or "Bots") are software programs that interact and/or communicate with users (human, machine, or otherwise) and take actions or make responses according to input from these users. "Bot" refers to any program which interacts with a user in some fashion and should not be assumed to refer only to physically embodied robots. "Input" refers to any description of a situation the Bot may encounter; although the most common inputs are textual inputs from users, inputs can be actions taken by users, external circumstances, or even events internal to the Bot such as an internal alarm clock.

A common use of a Bot is as an interface to a web site where the administrator of that site (the "administrator") has programmed the Bot to answer simple inquiries (the "input") that are typically asked by visitors to the site. The Bot finds a pattern, consisting of text and/or code, that best matches the input, and then takes the action that it is programmed to take in connection with that pattern (the "response"). The response can take the form of a text string that contains the information sought by the user (which text string can be transmitted to the user in text form, "read" by a text-to-speech engine, played back to the user as a wave file, or otherwise transmitted to the user in a comprehensible form) or the response can be any other action of which a program is capable, for example, opening a web page, turning a circuit on or off, initiating or ending a program, and the like.

It is desirable that the Bot be scripted to anticipate the inputs that it is likely to receive and the situations that it is likely to encounter. Because users may ask questions or otherwise create inputs in a wide variety of different ways, a large variety of patterns are required to comprehensively anticipate the variety of inputs that the Bot may receive. This complexity is greatly increased by the number of different ways a user may create any particular input. For example, if a user wants to know the name of the president of the Administrator's company, the user may input a text string reading "Who is your President?", "What's the President's name?", or even "Who's the top dog at AdminCo.?"

Historically, Bots have been scripted manually, by having one or more human scripters write patterns for the Bot and tie those patterns to appropriate responses. Such human scripting, although usually necessary, has a number of drawbacks. First, scripting is time-consuming. A typical Bot may contain thousands of possible patterns and responses, all of which need to be scripted. Second, the list of patterns and responses is usually incomplete. It is almost impossible for the scripters to comprehensively cover all possible patterns for a large body of information and desired responses. Third, there are many opportunities for misspellings or other errors. The greatest part of the time, expense, and difficulty of creating a Bot, therefore, is in the process of scripting it. Additionally, as the information changes or is added to over time, the time, expense, and difficulty of maintaining the patterns and responses that refer to the information are very substantial as well.

Scripting heretofore has been done in some form of code, either complex or simple, and has always required some level of aptitude and training. Furthermore, it takes a great deal of experience to successfully anticipate the questions that may be asked in any situation, making that task unsuited for lay people or lower pay grade workers.

Thus, there is a need in the art to have a method of scripting a Bot which successfully customizes the Bot to an individual application using knowledge that can be given to the Bot by any lay person or lower-level employee.

BRIEF SUMMARY OF THE INVENTION

It is an object of the present invention to provide a method of creating Bots according to patterns (or text strings) that are written in a very high level language that closely resembles a human natural language and are intended to anticipate the inputs that may be received from users.

It is a further object of the present invention to enable administrators with no specialized background, training, or expertise to enter information that will be incorporated into patterns and used by the Bot, thereby enabling the Bot to correctly respond to a multitude of different questions with the information the administrator provides.

The present invention meets these objectives by providing a method whereby an administrator with no special skills or knowledge can input information into a template. The information is manipulated by an editor to create a wide range of rules which are provided to an engine together with other rules of a background nature (if desired). The rules enable the engine to provide responses to a wide range of inputs without any further programming or action on the part of the administrator. In addition, the information will be saved and can be changed or edited later by the administrator.

The method according to the present invention includes inputting and saving the information, inserting the information into rules, and editing the information.

BRIEF DESCRIPTION OF THE SEVERAL VIEWS OF THE DRAWINGS

FIG. 2.1 is a flow chart of the processes used by an engine of the present invention;

FIG. 2.2 is a flow chart of the processes used by a preprocess input component of an engine of the present invention;

FIG. 3.1 is a schematic drawing of a script and associated component parts of the present invention;

FIG. 3.2 is a flow chart of an input recognizer component of a script of the present invention;

FIG. 4.1 is a flow chart of a statement validator of the present invention;

FIG. 4.2 is a flow chart of another statement validator of the present invention;

FIG. 4.3 is a flow chart of yet another statement validator of the present invention;

FIG. 4.4 is a flow chart of yet another statement validator of the present invention;

FIG. 5.1 is a flow chart of a logic layer component of a script of the present invention;

FIG. 5.2 is a flow chart of a response layer component of a script of the present invention;

FIG. 6.1 is a schematic drawing of a template of the present invention;

FIGS. 6.2-6.4 is a flow chart of the processes used by an information input & save component of the present invention;

FIG. 7.1 is a flow chart of the processes used by an insert information into rules component of the present invention;

FIG. 7.2 is a flow chart of the processes used by an edit information component of the present invention;

FIG. 8 is a schematic drawing of a script storage of the present invention; and FIGS. 9.1-9.3 are flow charts of the processes used by a get information component of the present invention.

DETAILED DESCRIPTION OF THE INVENTION

Figure 1:
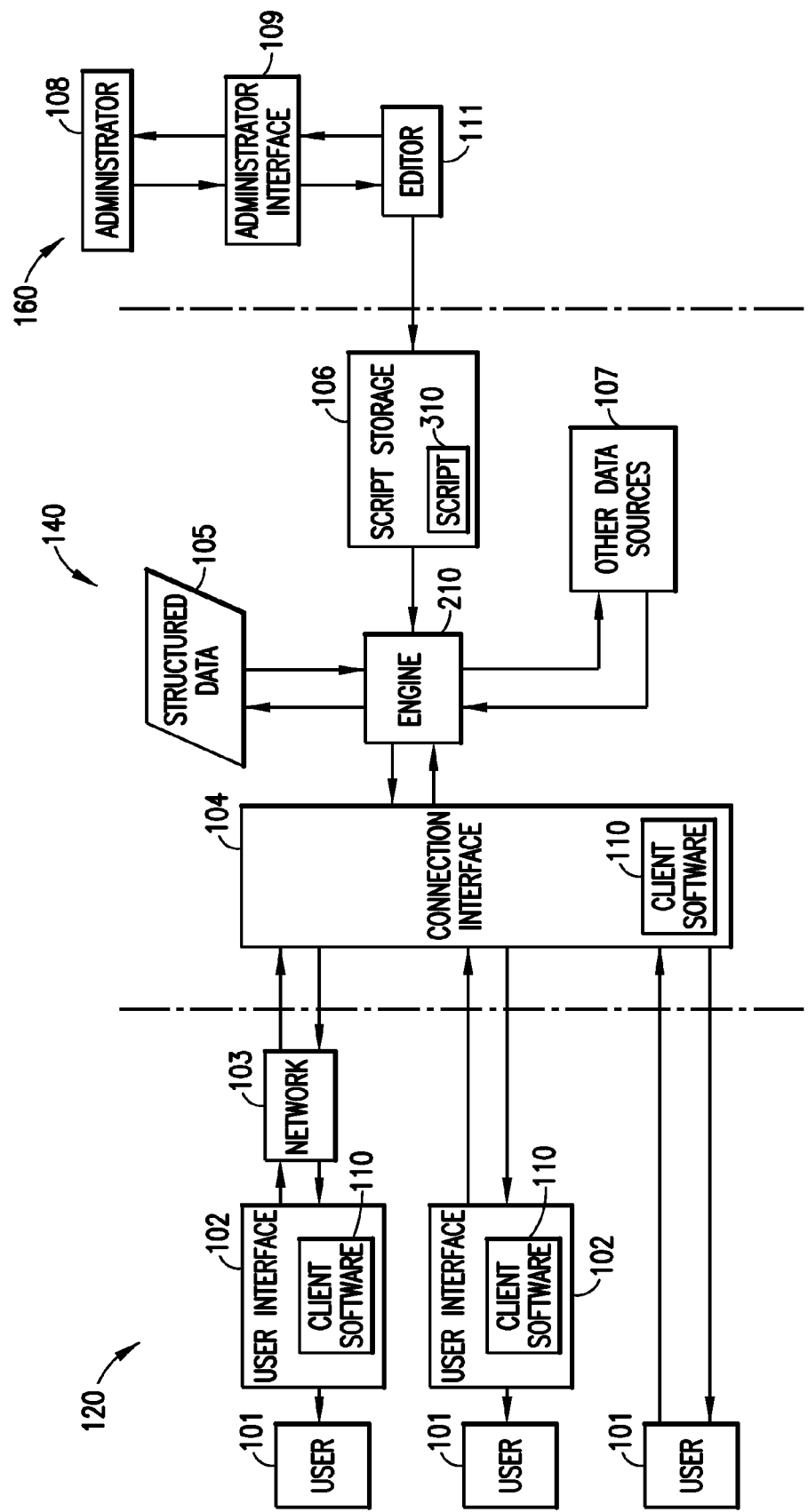
FIG. 1 is a schematic drawing of an operating environment of the present invention.

A complete understanding of the present invention will be obtained from the following description when taken in connection with the accompanying drawing figures wherein like reference characters identify like elements throughout.

The general architecture of the present invention will now be described. Referring to FIG. 1, an operating environment of the present invention is depicted. The environment can be characterized generally into three sections: a front end section 120, a Bot processor section 140, and an administration section 160.

The front end section 120 is generally an environment in which a user 101 interacts with a Bot connection interface 104, possibly via a user interface 102 that may be connected to the Bot connection interface 104 via a network 103. The user interface 102 can be anything capable of receiving human or machine language input, including, without limitation, a computer, a Personal Digital Assistant (PDA), a telephone, or a pager. The user interface 102 will also typically have some form of client software 110 installed to provide a text box, buttons, or other method for the entry of user 101 inputs and some method for displaying intelligible responses from the Bot. The network 103 can be any system capable of transmitting such input over any distance, including, without limitation, a local area network (LAN), the Internet, a "wifi" (wireless fidelity), cellular or other wireless data connection, a virtual private network (VPN), or simply a hard wired telephone system. The user 101 can also simply act directly upon the Bot connection interface 104. In such circumstances (as well as in circumstances such as telephony where the user input will not support client software 110), client software 110 will usually be resident in the Bot connection interface 104 to facilitate user 101 interaction. It will be appreciated that many other means of connection to the Bot processor section 140 are well known to those skilled in the art and that the present invention should not be limited to any particular aspects of the general operating environment as disclosed herein.

In a common use of Bot technology, the user 101 connects to a site where the user interface 102 includes client software 110. The advantage for the site developer is that the user 101 may have a help or information request that is easily handled via a Bot using the client software 110. It is not uncommon to find sites having a list of FAQs (Frequently Asked Questions) which serve the purpose of handling very low level user concerns and questions. However, where there are a substantial number of FAQ's, pointing and clicking through web pages becomes an inefficient method of finding the required information, as does searching with a conventional search engine. Bots provide a more efficient method of obtaining information and of handling more advanced questions or interactions with the site.

In the operating environment of this embodiment of the present invention, the Bot connection interface 104 consists of hardware, an operating system, and any application software necessary to support a Bot engine 210 and enable the Bot engine 210 to receive inputs and send responses in a chosen communications mode. Necessary application software in the Bot connection interface 104 may include an email application, an instant messaging application, an internet relay chat (IRC) application, voice recognition software, or other applications, as necessary, to support the chosen mode or modes of communication between the Bot engine 210 and the user 101. The client software 110, along with structured data 105 and script storage 106, may be resident on the Bot connection interface 104, although these may also be hosted on a remote computer and made available to the Bot engine 210 via a network 103 or other connection.

As the user 101 sends inputs, the Bot engine 210 receives the inputs, processes the inputs, and generates responses. Typically, where the user 101 is human, a two way communications dialogue occurs between the user 101 and the Bot engine 210 in that the user 101 may ask questions, make declarative statements, and perform other normal communications patterns that typify modes of human communications. For the purposes of the present invention, "communications" is intended to be a broad concept. Indeed, suitable communications may be in the form of written or spoken language, graphics, URLs, or the like that may be passed to and from a user and an automatic interface program, such as the present invention.

In turn, the Bot engine 210 accepts the inputs generated by the user 101 and generates responses by processing the inputs according to a script or scripts 310 that are stored in the script storage 106. As will be discussed in greater detail in connection with FIGS. 3.1 and 3.2, the scripts 310 contain rules 311 and are typically created at the administration section 160 as necessary or appropriate for the specific use to which the Bot will be put. For example, if the site using the Bot engine 210 is a site for a reseller of personal computers, then the scripts 310 should be designed to handle questions and discussions concerning personal computers and their peripherals. Thus, the administration section 160 will generate the scripts 310 such that the scripts 310 will guide the discussion concerning many computer-related topics. The scripts 310 are then stored for use by the Bot engine 210, or, alternatively, the scripts 310 may be compiled by a compiler and the compiled code incorporated into an engine (see, for example, U.S. Pat. No. 6,532, 401).

The administration section 160 consists of an administrator 108, an administrator interface 109, and an editor 111. The administrator 108 is the human being who creates the scripts 310 that govern the behavior of the Bot engine 210. Typically, this human being accomplishes this task through the use of the administrator interface 109 that has a text box or boxes or other entry points for the input of patterns, as well as a response or responses associated with that input. The administrator interface 109 may also provide various tools to facilitate the process of inputting the patterns in an organized and efficient way. The editor 111 takes the patterns provided by the administrator 108 and associates them with the appropriate response or responses. The administrator interface 109 and the editor 111 may be created as a single unit or may be designed to reside in separate computers. It will be appreciated by those skilled in the art that the scripts 310 can be written by human administrators or by automated or partially automated script creation tools and that the present invention should not be limited to scripts written by humans or otherwise.

Although FIG. 1 gives a general description of various operating environments in which Bots may exist, it will be appreciated that many other operating environments are obvious to those skilled in the art and that the scope of the present invention should not be so limited to the exemplary descriptions as given above.

The Bot processor section 140 will now be described. FIG. 2.1 provides a detailed depiction of the processes used by the Bot engine 210 according to the present invention. In step 211, inputs are brought to the Bot engine 210 via the Bot connection interface 104, as shown FIG. 1. The Bot engine 210 takes the input in step 211 and then, typically, but not necessarily, preprocesses the input to some degree to enable recognition and added functionality in step 220. Examples of some typical functions that may be contained in the preprocessing of input in step 220 are detailed below. The input is then taken to an input recognizer component 320 of each rule 311 in the script 310, where it is determined for each rule 311 whether the input is recognized, step 212. Step 212 is repeated for each rule 311, for so long as the input is not recognized. Once the input recognizer component 320 of a rule 311 recognizes an input in step 212, the process continues at step 213 to the next layer of the rule 311, which is either a response layer (or routine) 340 or a logic layer 330. Details of the workings of the input recognizer 320, the logic layer 330, and the response layer 340 are provided below in connection with FIGS. 3.2, 5.1, and 5.2

The preprocessing of input, step 220, will now be described. FIG. 2.2 provides a detailed depiction of the processes used by the preprocess input step 220, if utilized, of the Bot engine 210 according to the present invention. The functions contained in the preprocess input step 220 can vary greatly among different Bot designs, depending upon the overall strategy employed by the designer. Typically the preprocess input step 220 is composed of processes that are intended to either: (i) standardize the inputs in some regard in order to reduce the complexity of the input faced by the engine or (ii) extract some level of structure or meaning from the input and embody this as code so that the Bot engine 210 can manipulate or manage it. Examples of the first purpose include a remove punctuation process 222, a spell check process 223, an expand contractions process 224, and a standardize case 225 process. Examples of the second purpose include a lexical analysis process 226, a semantic analysis process 227, and other translation processes 228.

In the embodiment described herein, the preprocess input step 220 begins by taking the input in step 221 and then proceeding to remove punctuation in step 222. Removing the punctuation from a text string removes the ambiguity created by the fact that people punctuate their sentences differently and that some people forget to punctuate at all.

Next the input is spell checked at step 223 so that spelling errors can be removed, further minimizing text variation due to error or variant usage by the user 101.

By proceeding to expand contractions in step 224, the input is further standardized so that the Bot engine 210 can recognize contracted words, for example, "what's" as being identical to its constituent parts "what is", further reducing the complexity of the inputs that the Bot engine 210 must be able to recognize.

The next step 225 standardizes case, allowing the Bot engine 210 to recognize, for example, "the", "The", and "THE" as being identical, and removing as a variable the scheme of capitalization that may have been employed by the user 101.

The input is then passed to lexical analysis in step 226, where processes relating to the meaning of words are performed. As an example, lexical analysis might parse or partition the input to determine those text strings that are synonymous (at least for the administrator's purposes) with other text strings, for example, "I want", "I need", and "Give me", Typically these text strings would be replaced with a text or code string that stands in for them in the input, allowing a single rule 311 to recognize an input phrased in any of these different ways.

Next the input goes through semantic analysis in step 227, which is useful in identifying parts of the sentence, for example, the subject of the sentence, the object of the verb, or the referent of a pronoun. Depending upon the methodologies used, this step can be useful for pattern recognition and/or for maintaining context in a "conversation" between the user 101 and the Bot.

Finally, the input is passed through other translations in step 228, where the other translations are any other processes whereby strings are added to or substituted for portions of the input in order to add functionality to the Bot. These processes may include language translation, substitutions of machine language for natural language, or other methodologies.

Those skilled in the art will readily understand that some or all of the above exemplary processes might be included at this stage in various orders and configurations and that there are other processes of similar purpose that may be undertaken in a Bot suitable for the present invention. Similarly, some or all of these objectives may be achieved by incorporating the functionality into the rules used to recognize inputs.

The recognition of input, step 212, will now be described. FIG. 3.1 depicts the structure of an embodiment of a script 310 and its component parts, suitable for the purposes of the present invention. The script 310 contains one or more rules 311 that are in turn composed of an input recognizer 320 and one or more response layers 340. Some rules 311 may also contain a logic layer 330, enabling them to fire one or more responses of those that are available. The detailed processes of each of these components are described in more detail below. As those skilled in the art will readily understand, there are many different strategies and methods by which the rules 311 can be ordered, grouped, or sorted in order to enhance the speed or accuracy of the Bot engine 210 and that the present invention should not be limited to any particular method or strategy of ordering, grouping, or sorting the rules 311.

The steps of the input recognizer 320 are depicted in more detail in FIG. 3.2. The first step 321 in input recognition is typically the matching of the preprocessed input to a pattern contained in a set of pattern matches of the input recognizer 320. A pattern is a coded text string that represents a set of strings. A string matches a pattern if the string is in the set that the pattern represents. Pattern matching may be accomplished by, for example, regular expressions. As those skilled in the art will also be aware, there are many different languages and protocols in which such pattern matchings are commonly carried out, including, without limitation, Perl, Java, PHP, and others, and that the present invention should not be limited by the use of any particular query, language, or protocol. If there is no match found in the pattern matches, the input will not be recognized and the Bot engine 210 will continue to search for a match in other rules 311. If a pattern match is found, for most Bot engines 210, the rule 311 will then go into effect.

The administrator 108 has the option of creating one or more statement (input) validators 410a-d involving the querying of the structured data 105 which, if true, will result in the successful recognition of the input in step 324 and the effectiveness of the rule 311, and which if false, will provide for the non-recognition of the input in step 322 by the input recognizer 320, with the result that the Bot engine 210 will continue to seek for a matching pattern in other rules 311. Each of these statement validators 410a-d is tested in turn in step 323, for so long as they continue to be valid. If any statement validator 410a-d is invalid, the input is not recognized in step 322. If all are valid, the input is recognized in step 324.

There can be any number of statement validators 410a-d that work with pattern matches 321 in the input recognizer 320 or none at all. Upon completion of pattern matches 321 and validation 323 of the statement validators 410a-d, if any, contained in the input recognizer, the input is ultimately recognized 324 or not recognized 322. If recognized 324, the process continues to the next layer of the rule 311, whether that is a response layer 340 that generates a response to be transmitted to the user or a logic layer 330 that chooses between the various responses to be used in the response layer 340.

Those skilled in the art will readily understand that the steps of the input recognizer 320 might occur in various orders (or contemporaneously with each other) and configurations and that there are other processes of similar purpose that may be undertaken in a Bot suitable for the present invention.

The generation of responses will now be described. The next step in the execution of a rule 311 following recognition of an input at step 324 by the input recognizer 320 is typically to go to a response layer 340 (FIG. 5.2), the purpose of which is to obtain and prepare the appropriate response to the user's input. A typical data flow for a response layer 340 simply involves getting the response in step 521 and sending it to the connection interface in step 526. A response can typically consist of (i) text, (ii) code to be run in the user interface 102, and/or (iii) code to be extracted and run locally before sending the response to the Bot connection interface 104. The response may consist entirely of text, where this is appropriate. However, more complexity and functionality can be provided by adding code to the response. The use of code allows for dynamic information to be added to the answer and is typically used for frequently changing information, such as the time, stock quotes, weather, or the like. Most typically, the code is non-extractable and is sent to the Bot connection interface 104 in step 526, to be sent to and run in the user interface 102, bringing a web page, running a java applet, or taking some other action that brings the required information to the user 101. Where it is desirable to embed the information provided by running the code in the response, the response is determined to contain extractable code in step 522, the code is extracted in step 523, and the code is run locally in step 524, so that the dynamic information required is embedded in the response in step 525 before transmission to the Bot connection interface 104 in step 526.

A rule 311 can also be designed to employ a logic layer 330 as shown in FIG. 5.1. The purpose of the logic layer 330 is neither input recognition 320, nor response generation, but rather the choosing of an appropriate response upon recognition of an input. This is accomplished by the use of a logical function in step 511. The logical function step 511 may result in a random choice of responses, choosing responses in rotation, or choosing the proper response after appeal to some outside piece of information 107 (for example, the time) or after querying the structured data 105 using simple queries and/or any of the statement validators 410a-d described herein. In this case, the truth or falsity of the logical statement in step 414a-d in the statement validator 410a-d would result in a choice in step 511 between two or more different results (responses) in step 520. It is important to distinguish between such a choice between results in step 511, and the above-described function of the statement validator 410a-d, so as to enable an input recognizer 320 to either recognize or not recognize an input.

The present invention is principally located in the administration section 160 of the Bot, but posts information that may ultimately be held in the script storage 106 and/or in the structured data 105 of the Bot processor.

The process of inputting information 620a-c will now be described. Referring to FIGS. 6.1-6.4, the administrator interface 109 contains a template 610 for the input of information in step 620a-c. The template 610 provides an opportunity for the administrator 108 to provide information in a standardized format. This is accomplished by a page, application, or other user interface containing fields 611, for example, text boxes, check boxes, drop-down boxes, or the like, that are labeled or otherwise intended to elicit specific pieces of information from the administrator 108. Many variations on the template 610 are possible, including, without limitation, providing a series of questions to be answered by the administrator 108 (e.g., "What is your company name?", "What is your company address?"), providing the administrator 108 with tables to be filled in with relevant information (e.g., a corporate organization chart with names, titles, phone numbers, email addresses, or the like), and interviewing the administrator 108 via Bot or human interaction and then embodying the information in some form of template 610 or table. The process is initiated with the specific purpose of eliciting individual pieces of standardized information from the administrator 108. At the end of the process, the administrator 108 has provided the administrator interface 109 with individual pieces of information such as names, addresses, slogans, product descriptions, or the like, that are specific to the administrator's 108 company or entity.

Referring again to FIGS. 6.1-6.4, the process of saving information 620a-c will now be described. Following the input of information in step 621, the editor 111 saves the information in step 622 so that it will not be lost. As those skilled in the art will know, this can be done on manual command by the administrator 108 or automatically upon the occurrence of certain events, such as the passage of time or the closing of the template 610. There are at least three places where the information can be saved. The information can be saved: (i) as part of the template 610 in step 623, (ii) as structured data 105 in step 624, or (iii) into the rules 311 at step 710 without any intermediate storage steps by directly inserting the information into the rules 311. For some embodiments it is desirable to store the information in more than one place, depending upon the purposes for which the information will be used. For example, the information stored in the structured data 105 may be used solely to refresh the template 610, while the information stored in the rules 311 may be used to run the Bot engine 210.

The ability to save the information within the template at step 623 depends upon the structure and programming of the template 610 to possess such a storage capability. Storing the information as structured data 105 in step 624 involves saving the information within each of the fields 611 to a separate field or location within the structured data 105. In order to save the information by inserting information into the rules 311 at step 710, a more elaborate procedure is necessary, as is described in more detail immediately below.

Referring to FIG. 7.1, the process of inserting information into the rules 311 will now be described. For most embodiments of the invention, it is necessary to insert the information entered by the administrator 108 into the rules 311 in step 710 before the Bot engine 210 will be able to access the information and use it to recognize and respond to inputs. However, it should be noted that it is also possible to have the Bot engine 210 access the information from the structured data 105 or from the template 610, depending on where the information is saved.

Referring to FIGS. 7.1 and 8, first, the editor 111 obtains the rules 311 from script storage 106 in step 701. The editor 111 may obtain all of the rules 311 in the script storage 106, but in the preferred embodiment may include only those rules 311 contained in a template information script 310*a*, as these are the only rules 311 that should be affected by the information. Next, for each rule 311, the editor 111 checks to see if the input recognizer 320 needs information in step 702. The need for information may be signaled either by a specific tag or instruction embedded in a text string used by the input recognizer 320 or by the recognition by the editor 111 of a piece of code in the input recognizer 320 which calls for a specific piece of information (or by any such tagged text string, code, or similar instruction, that is by a "signifier"). If there is such a signifier, the editor 11 obtains the necessary information from a corresponding field in the template 610 in step 703 and inserts the information into the input recognizer 320 in step 704. This continues at step 702 for all rules 311 until the process is done. Similarly, for each rule 311, the editor 11 checks to see if the response layer 340 needs information in step 708, as signaled by a signifier (described above) in the response layer 340. If there is such a signifier, the editor 11 obtains the necessary information in step 709 and inserts it into the response layer 340 in step 710. This continues at step 708 for all rules 311 until the process is done. Finally, for each rule 311, the editor 11 checks to see if the logic layer 330, if present, needs information in step 705, as signaled by a signifier (described above) in the logic layer 330. If there is such a signifier, the editor 11 obtains the necessary information in step 706 and inserts it into the logic layer 330 in step 707. This continues at step 705 for all rules 311 until the process is done at step 711.

In a preferred embodiment, each layer 330, 340 is checked across all rules 311 before moving on to the next layer 330, 340. Variations in method are possible, such as checking all layers 330, 340 in each rule 311 before moving on to the next rule 311.

Referring to FIGS. 7.2 and 9.1-9.3, the process of editing information will now be described. Once the information has been saved in the appropriate manner and, if desired, inserted into the rules 311, it is still desirable that the information be easily updatable within the template 610 in step 720. In order to achieve this, the editor 111 obtains the information in step 721 from wherever it has been stored. The processes used to obtain information 910*a-c* depend on how the information is stored.

If the information has been stored as part of the template 610 itself, the information is automatically restored to the fields 611 or other points of data entry as a function of the template 610.

If the information has been stored in the structured data 105, the editor 111 follows essentially the process 910*a*. In this process, for each field 611 in the template 610, the editor 111 obtains instructions in step 911*a* which indicate where the information for the field 611 is to be found. Next, the editor 111 executes the instructions in step 912*a* to obtain the information. The editor 111 sends the information to the appropriate field 611 in the template 610 in step 913*a*. The editor 111 then determines if there are more fields 611 for which to obtain information in step 914*a*. If the answer is yes, the editor 311 repeats the process for each field 611 until there are no more fields 611 for which to obtain information. At this point, all of the fields 611 are filled with the appropriate information and the editor 111 is finished with the get information process.

If the information has been stored by inserting the information into the rules 311 in step 710, the process used has some variability as set in processes 910*a-c*. The process 910*a* (described above) may be used to obtain information from the rules 311. For each field in the template, the editor 111 obtains instructions in step 911*a* as to where to find the information. The editor 111 executes the instructions to obtain the information in step 912*a* from the appropriate rule 311, and then sends the information to the field 611 in step 913*a*.

Alternatively, the processes of 910*b* and 910*c* may be used. The first step is to obtain the rules 311 in step 921*b*, 921*c*. Next, the editor checks each rule 311 for a signifier in step 922*b*, 922*c*. If the rule 311 has a signifier, the editor 111 either executes instructions to obtain the information associated with that rule 311 in step 912*b* or obtains tagged information contained in that rule 311 in step 931*c*. In either instance, the information is then sent to the appropriate field in the template 610 in step 913*b*, 913*c*. The process is repeated until all of the rules 311 have been checked.

Once the template has been repopulated with information by the process of obtaining information 910*a-c*, the administrator 108 is free to use the input and save the information process 620*a-c*, as discussed above, thus, effectively updating the information contained in the template 610 and anywhere else that the information has been saved.

The present invention enables a person to successfully customize a Bot for an individual application where the person uses knowledge that can be given to the Bot by any lay person or lower-level employee. This results in several important advantages. Information can be inexpensively input, and fully effective rules formed, by administrators working at pay grades substantially below that of a skilled programmer. Cost is further reduced by the fact that little or no training is required to accomplish this task. Speed to completion is dramatically enhanced, as there is no actual scripting that needs to take place—it all takes place automatically upon completion. The opportunity for error is greatly reduced, and consistent effectiveness of the rules at responding to inputs is greatly enhanced, dramatically increasing overall quality. The invention also provides a way to easily and consistently create and manage a large number of similarly-tasked Bots.

It will be understood by those skilled in the art that while the foregoing description sets forth in detail preferred ordering of steps of the various processes, other ordering of the steps are contemplated by the present invention.

It will be understood by those skilled in the art that while the foregoing description sets forth in detail preferred embodiments of the present invention, modifications, additions, and changes might be made thereto without departing from the spirit and scope of the invention.

The invention claimed is:

1. A method for maintaining at least one response by an administrator in a system for autonomously processing requests, comprising the steps of:
   providing a template to the administrator, wherein the template includes a plurality of input fields to receive information in a standardized format from the administrator, and wherein each input field of the plurality of input fields corresponds to a question or label displayed on the template to elicit the information;
   receiving the information input by the administrator into the template;
   identifying rules requiring information by determining if at least one signifier is present in each rule of a plurality of rules, wherein at least one rule of the rules requiring information comprises a response layer, and wherein the at least one signifier corresponds to at least one input field of the plurality of input fields;

inserting at least a portion of the information into each rule of the rules requiring information based at least partially on the at least one signifier; and making the information accessible to a rules-based program for use in providing the at least one response in reply to a request from a user, wherein the response layer of the at least one rule influences the identification or preparation of a plurality of responses comprising the at least one response.

2. The method according to claim 1, wherein the step of making the information accessible to the rules-based program saves the information as part of the template, as structured data, and/or into the plurality of rules.

3. The method according to claim 1, wherein at least one rule of the plurality of rules comprises an input recognizer component, and wherein the step of identifying rules requiring information includes the steps of:

determining whether the input recognizer component needs information, if the input recognizer component needs information, retrieving the information from a corresponding field in the template and inserting the information into the input recognizer component.

4. The method according to claim 3, wherein the step of identifying rules requiring information includes the steps of:

determining whether the response layer of the at least one rule needs information, and if the response layer needs information, retrieving the information from a corresponding field in the template and inserting the information into the response layer.

5. The method according to claim 3, wherein the step of determining whether the input recognizer component needs information, includes the step of identifying the at least one signifier.

6. The method according to claim 1, wherein the at least one rule comprises a logic layer configured to influence a choice of the at least one response from the plurality of responses identified or prepared by the response layer, and wherein the step of identifying rules requiring information includes the steps of:

determining whether the logic layer of the at least one rule needs information, and if the logic layer needs information, retrieving the information from a corresponding field in the template and inserting the information into the logic layer.

7. The method according to claim 1, wherein the signifier is a tag in a text string.

8. The method according to claim 1, wherein the signifier is an instruction embedded in a text string.

9. The method according to claim 1, wherein the signifier is a code.

10. The method according to claim 1, wherein the step of identifying rules retrieves all of the rules in a template information script.

11. The method according to claim 1, wherein the step of making the information accessible to the rules-based program is accomplished by receiving a manual command from a user.

12. The method according to claim 1, wherein the step of making the information accessible to the rules-based program is accomplished automatically upon the occurrence of a predefined event.

13. The method according to claim 12, wherein the predefined event is closing of the template.

14. The method according to claim 12, wherein the predefined event is passage of a predetermined amount of time.

15. The method according to claim 12, wherein the predefined event is activation of a save function by the administrator.

16. The method according to claim 1, further including the step of enabling the administrator to edit the information.

17. The method according to claim 16, wherein the step of enabling the administrator to edit the information includes the steps of:

retrieving the information, posting the information in at least one appropriate field in the template, receiving edited information from the administrator into the template, and making the edited information accessible to the rules-based program for use in providing the at least one response in reply to a request from the user.

18. The method according to claim 17, wherein:

the step of making the information accessible to the rules-based program saves the information as part of the template, and the step of retrieving the information includes the step of restoring the information to the at least one field.

19. The method according to claim 17, wherein:

the step of making the information accessible to the rules-based program saves the information as structured data, and the step of retrieving the information includes the steps of, for at least one of the at least one field in the template:

retrieving instructions indicating where the information is stored, and executing the instructions to retrieve the information.

20. The method according to claim 17, wherein:

the step of making the information accessible to the rules-based program saves the information into rules, and the step of retrieving the information includes the steps of, for at least one of the at least one field in the template:

retrieving instructions indicating where the information is stored, and executing the instructions to retrieve the information.

21. The method according to claim 17, wherein:

the step of making the information accessible to the rules-based program saves the information into rules, and the step of retrieving the information includes the steps of, for each rule used:

determining whether the rule includes a signifier, and if a signifier is included, executing instructions from the signifier to retrieve the information associated with the rule.

22. A computer-implemented method for programming virtual robots using templates, comprising:

displaying, on at least one display device, a template interface comprising a plurality of input fields each corresponding to one of a plurality of labels or questions;

receiving response information in the plurality of input fields on the template interface from an administrator;

determining, with at least one processor, a set of rules needing information by identifying rules comprising at least one signifier from a plurality of rules, such that each rule in the set of rules comprises at least one signifier;

identifying at least a portion of the response information received in the plurality of input fields corresponding to the at least one signifier in each rule in the set of rules;

inserting the at least a portion of the response information corresponding to the at least one signifier in each rule in the set of rules; and making the set of rules available to at least one virtual robot configured to receive user input and provide responses to the user input based at least partially on the set of rules.

23. The computer-implemented method of claim 22, wherein each rule of the set of rules comprises an input recognizer component and a response layer.

24. The computer-implemented method of claim 23, wherein the at least one signifier of each rule in the plurality of rules is contained in at least one of the input recognizer component and the response layer.

25. The computer-implemented method of claim 22, wherein each rule of the set of rules comprises a response layer that influences an identification or preparation of at least one possible response to the user input.

26. The computer-implemented method of claim 25, wherein each rule of the set of rules further comprises a logic layer, wherein the response layer influences an identification or preparation of a plurality of possible responses to the user input, and wherein the logic layer influences a determination of at least one response from the plurality of possible responses.

27. A system for programming virtual robots using templates, comprising:
   (a) a template interface configured to display a plurality of questions to an administrator and receive information from the administrator in a plurality of fields corresponding to the plurality of questions; and
   (b) an engine executed by at least one processor, the engine configured to:
      (i) access a plurality of rules contained in a script corresponding to the template interface, wherein each rule of the plurality of rules comprises at least one of the following: an input recognizer component, a response layer, a logic layer, or any combination thereof;
      (ii) determine, for each rule of the plurality of rules, if the rule needs information by identifying at least one signifier in at least one of the following: an input recognizer component, a response layer, a logic layer, or any combination thereof, wherein at least one rule needs information;
      (iii) identify at least one portion of the information received by the template that corresponds to the at least one signifier in the at least one rule; and
      (iv) insert the at least one portion of the information in the at least one rule.

28. The system of claim 27, wherein the engine is further configured to make the rules available to at least one virtual robot configured to process user input and provide responses based on the processed user input.

29. The system of claim 27, wherein at least one rule of the plurality of rules comprises an input recognizer component and a response layer.

30. The system of claim 29, wherein the at least one signifier of each rule in the plurality of rules is contained in at least one of the input recognizer component and the response layer.

31. The system of claim 27, wherein at least one rule of the plurality of rules comprises a response layer that influences an identification or preparation of at least one possible response to the user input.

32. The system of claim 31, wherein each rule of the set of rules further comprises a logic layer, wherein the response layer influences an identification or preparation of a plurality of possible responses to the user input, and wherein the logic layer influences a determination of at least one response from the plurality of possible responses.

33. The system of claim 27, wherein the information received in the template is stored in at least one of the following: the template, a data structure, directly in the plurality of rules, or any combination thereof.

34. The system of claim 27, wherein the at least one signifier is at least one of the following: a tag in a text string, an instruction embedded in a text string, a code, or any combination thereof.

35. The system of claim 27, further including an editor adapted to access the information and enable the administrator to edit the information.

\* \* \* \* \*